US012707017B2

(12) United States Patent
Kong et al.

(10) Patent No.: US 12,707,017 B2
(45) Date of Patent: Aug. 11, 2026

(54) IMAGE PROCESSING DEVICE, ELECTRONIC DEVICE HAVING THE SAME, AND OPERATING METHOD THEREOF

(71) Applicant: SAMSUNG ELECTRONICS CO., LTD., Suwon-si (KR)

(72) Inventors: Juntaek Kong, Suwon-si (KR); Seungwon Choi, Suwon-si (KR); Jongseong Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 390 days.

(21) Appl. No.: 18/244,703

(22) Filed: Sep. 11, 2023

(65) Prior Publication Data

US 2024/0267479 A1 Aug. 8, 2024

(30) Foreign Application Priority Data

Feb. 7, 2023 (KR) ........................ 10-2023-0015880

(51) Int. Cl.

| | |
|---|---|
| ***H04N 1/60*** | (2006.01) |
| ***G06T 7/10*** | (2017.01) |
| ***G06T 7/90*** | (2017.01) |
| ***G06V 10/56*** | (2022.01) |

(52) U.S. Cl.

CPC ............ *H04N 1/6066* (2013.01); *G06T 7/10* (2017.01); *G06T 7/90* (2017.01); *G06V 10/56* (2022.01); *G06T 2207/10024* (2013.01)

(58) Field of Classification Search

CPC .. H04N 1/6066; H04N 1/6027; H04N 1/6075; H04N 9/67; H04N 9/643; H04N 23/841; H04N 23/86; G06T 7/10; G06T 7/90; G06T 2207/10024; G06V 10/56; G06N 3/04

See application file for complete search history.

(56) References Cited

U.S. PATENT DOCUMENTS

| | | | |
|---|---|---|---|
| 9,386,289 | B2 | 7/2016 | Tuna et al. |
| 9,633,287 | B2 | 4/2017 | Kawabata et al. |
| 9,812,085 | B2 | 11/2017 | Matsumoto |
| 10,235,779 | B2 | 3/2019 | Min et al. |
| 10,897,557 | B2 | 1/2021 | Komatsu |

(Continued)

FOREIGN PATENT DOCUMENTS

| | | | |
|---|---|---|---|
| AU | 2011320937 | B2 | 5/2012 |
| JP | 2016-526830 | A | 9/2016 |

(Continued)

OTHER PUBLICATIONS

Communication issued Apr. 16, 2024 by the European Patent Office in European Patent Application No. 23207258.7.

(Continued)

*Primary Examiner* — Christopher Wait
(74) *Attorney, Agent, or Firm* — Sughrue Mion, PLLC

(57) ABSTRACT

An image processing device includes a memory device that stores a color conversion module, and one or more processors that access the memory device and execute the color conversion module to calculate a color gamut of an input image and perform color conversion of the input image by applying different color conversion matrices according to the color gamut.

20 Claims, 14 Drawing Sheets

(56) References Cited

U.S. PATENT DOCUMENTS

| | | | | |
|---|---|---|---|---|
| 2009/0003696 | A1* | 1/2009 | Ishii | H04N 1/6058 382/167 |
| 2014/0376611 | A1 | 12/2014 | Kim et al. | |
| 2015/0332653 | A1* | 11/2015 | Kakinuma | H04N 1/465 345/600 |
| 2017/0251128 | A1 | 8/2017 | Horita et al. | |
| 2022/0239803 | A1 | 7/2022 | Watanabe | |

FOREIGN PATENT DOCUMENTS

| | | | |
|---|---|---|---|
| JP | 7131727 | B1 | 9/2022 |
| JP | 2022-145960 | A | 10/2022 |

OTHER PUBLICATIONS

Perez, Frank et al., "Toward Color Image Segmentation in Analog VLSI: Algorithm and Hardware", International Journal of Computer Vision, Feb. 1, 1994, vol. 12, No. 1, pp. 17-42. (26 pages total).

* cited by examiner

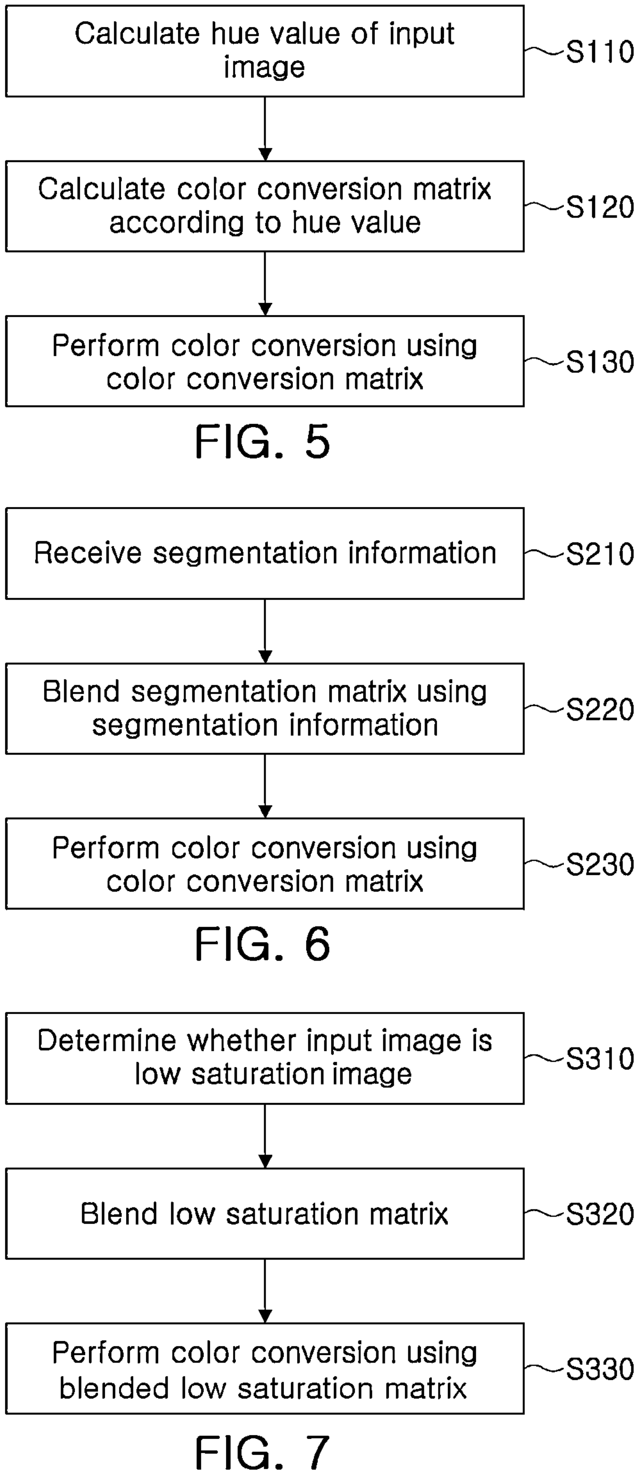
Calculate hue value of input image
S110
Calculate color conversion matrix according to hue value
S120
Perform color conversion using color conversion matrix
S130
FIG. 5
Receive segmentation information
S210
Blend segmentation matrix using segmentation information
S220
Perform color conversion using color conversion matrix
S230
FIG. 6
Determine whether input image is low saturation image
S310
Blend low saturation matrix
S320
Perform color conversion using blended low saturation matrix
S330
FIG. 7

IMAGE PROCESSING DEVICE, ELECTRONIC DEVICE HAVING THE SAME, AND OPERATING METHOD THEREOF

CROSS-REFERENCE TO RELATED APPLICATION

This application claims priority under 35 USC 119(a) of Korean Patent Application No. 10-2023-0015880, filed on Feb. 7, 2023 in the Korean Intellectual Property Office, the entire disclosure of which being incorporated by reference herein for all purposes.

BACKGROUND

The present disclosure relates to an image processing device, an electronic device including the same, and an operating method thereof.

In general, as image capturing technology and image display device technology advance, the range of colors that can be expressed gradually expands. Consequently, there are numerous instances where the color gamut of the image display device and the color gamut of an input image displayed on the device differ. When the color gamut of the input image varies from that of the image display device, the image display device carries out a gamut mapping process to display the input image with a color gamut distinct from its own.

SUMMARY

It is an aspect to provide an image processing device expressing an image of a color tone desired by a user, an electronic device including the same, and an operating method thereof.

According to an aspect of one or more example embodiments, there is provided an image processing device comprising a memory device configured to store a color conversion module; and at least one processor configured to access the memory device and execute the color conversion module to calculate a color gamut of an input image and perform color conversion of the input image by applying different color conversion matrices according to the color gamut.

According to another aspect of one or more example embodiments, there is provided a method of operating an image processing device, the method comprising calculating a hue value of an input image; calculating a color conversion matrix according to the hue value; and performing color conversion of the input image using the color conversion matrix.

According to yet another aspect of one or more example embodiments, there is provided an electronic device comprising an image sensor configured to acquire an image of a target; and an application processor configured to perform conversion of a Hue, Saturation, Value (HSV) domain on the image, determine a color gamut to which each pixel belongs according to a value of a phase of the HSV domain, and perform different color conversion operations on pixels of the image depending on the color gamut.

According to yet another aspect of one or more example embodiments, there is provided a method performed by an image signal processor, the method comprising receiving an image; performing a first color conversion on the image in a state in which a color conversion matrix mode is turned on; and performing a second color conversion on the image in a state in which the color conversion matrix mode is turned off, wherein the color conversion matrix mode performs the first color conversion by applying different color conversion matrices according to a color gamut of an input pixel of the image.

BRIEF DESCRIPTION OF DRAWINGS

The above and other aspects will be more clearly understood from the following detailed description, taken in conjunction with the accompanying drawings, in which:

FIG. 5 is a flowchart illustrating a color processing operation of the image processing device, according to some example embodiments;

FIG. 6 is a flowchart exemplarily illustrating a segmentation processing operation of the image processing device, according to some example embodiments;

FIG. 7 is a flowchart illustrating a saturation processing operation of the image processing device, according to some example embodiments;

DETAILED DESCRIPTION

Hereinafter, various example embodiments will be described with reference to the accompanying drawings.

In an image processing device and an operating method thereof according to some example embodiments, applying different color conversion matrices based on the color of individual pixels in an image allows the expression of the desired color tone by the user.

In the image processing device and the operating method according to some example embodiments, color conversion may be carried out using original pixel values, saturation values, and external segmentation information. In this case, color adjustments may be made differently using information from the original image (including original pixel value, saturation value, and external segmentation information). In some example embodiments, color conversion may be performed using distinct matrices for each color gamut. In some example embodiments, a matrix based on segmentation information and saturation may be adjusted.

Figure 1:
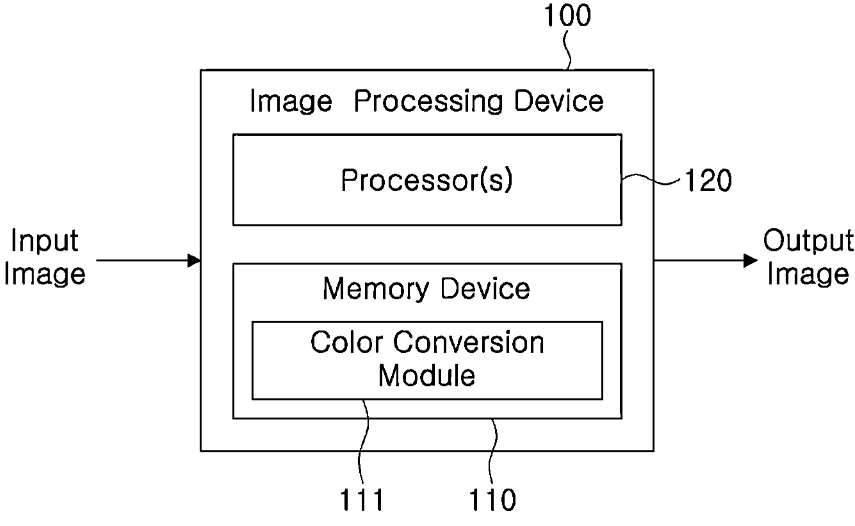
FIG. 1 is a diagram illustrating an image processing device according to some example embodiments.

FIG. 1 is a diagram illustrating an image processing device according to some example embodiments. Referring to FIG. 1, an image processing device 100 may include a memory device 110 and one or more processor(s) 120. References below will be made to "the processor 120" with the understanding that the description applies equally to the one or more processor(s) 120.

The memory device 110 may be electrically connected to the processor 120 and may store data necessary for driving the image processing device 100. For example, the memory device 110 may be implemented as an internal memory such as Read Only Memory (ROM) (e.g., electrically erasable programmable read-only memory (EEPROM)) or Random Access Memory (RAM) included in the processor 120, or may be implemented as an external memory separate from the processor 120. The memory device 110 may be implemented in the form of a memory embedded in the image processing device 100 or in the form of a removable memory in the image processing device 100 according to a data storage purpose. For example, data for driving the electronic device 100 is stored in a memory embedded in the image processing device 100, and data for an extended function of the image processing device 100 may be stored in a memory attachable to or detachable from the image processing device 100.

In some example embodiments, a memory embedded in the image processing device 100 may be implemented as at least one of volatile memory (such as dynamic RAM (DRAM), static RAM (SRAM), or synchronous dynamic RAM (SDRAM)), a non-volatile memory (e.g. one time programmable ROM (OTPROM), a programmable ROM (PROM), an erasable and programmable ROM (EPROM), an electrically erasable and programmable ROM (EEPROM), a mask ROM, a flash ROM), a flash memory (e.g. NAND flash or NOR flash, etc.), a Hard Drive, or Solid State Drive (SSD). A memory that may be attached to and detached from the image processing device 100 may be implemented in the form of memory cards (e.g. Compact Flash (CF), Secure Digital (SD), Micro Secure Digital (Micro-SD), Mini Secure Digital (Mini-SD), extreme Digital (xD), Multi-Media Card (MMC), etc.), an external memory (e.g., USB memory) connectable to the Universal Serial Bus (USB) port, or the like.

The memory device 100 may store a color conversion module 111. The color conversion module 111 may apply different color conversion matrices according to the color of each pixel of the image. In an example embodiment, the color conversion module 111 may perform color conversion using original pixel values, saturation values, and segmentation information. In this case, the color may be differently adjusted using information of the original image (including original pixel value, saturation value, and external segmentation information). In an example embodiment, the color conversion module 111 may perform color conversion using a different matrix for each color gamut. In an example embodiment, the color conversion module 111 may correct a matrix according to segmentation information and saturation.

In some example embodiments, the memory device 110 may store a learning network model used to improve the quality of an input image. In this case, the learning network model may be a machine learning model based on a plurality of sample images, a noise map for each sample image, and an original image corresponding to each sample image. For example, the learning network model may be a Convolution Neural Network (CNN) model trained on a plurality of sample images, a noise map for each sample image, and an original image corresponding to each sample image. In this case, CNN is a multilayer neural network with a special connection structure for voice processing, image processing, and the like. However, the learning network model is not limited thereto, and in some example embodiments, the learning network model may be based on various neural networks such as Recurrent Neural Network (RNN) and Deep Neural Network (DNN).

The one or more processor(s) 120 may be electrically connected to the memory device 110 to control overall operations of the image processing device 100. The processor 120 may be implemented as a digital signal processor (DSP), a microprocessor, or a timing controller (T-CON) that processes a digital image signal. However, the processor 120 is not limited thereto, and in some example embodiments may include one or more of a central processing unit (CPU), a micro controller unit (MCU), a micro processing unit (MPU), a controller, an application processor (AP), a communication processor (CP)), or the ARM processors, and may be defined as the corresponding term. In some example embodiments, the processor 120 may be implemented as a System on Chip (SoC) or a large scale integration (LSI) in which a processing algorithm is embedded, and may also be implemented in the form of a Field Programmable Gate Array (FPGA).

The processor 120 may be implemented to drive the color conversion module 111 by performing at least one instruction.

The processor 120 may process the input image to obtain an output image having an improved quality of the input image. In detail, the processor 120 obtains a noise map representing the quality of the input image from the input image, and an output image with improved quality of the input image may be obtained by applying the input image and the noise map to a learning network model including a plurality of layers. Since the noise map obtained from the input image is used in the process of improving the quality of the input image, quality improvement is performed adaptively according to the type of the input image. The quality improvement effect may be improved. In this case, the learning network model may be an artificial intelligence model obtained by learning a relationship between a plurality of sample images, a noise map for each sample image, and an original image corresponding to each sample image through an artificial intelligence algorithm. The plurality of layers of the learning network model may include an input layer, an intermediate layer, and an output layer. The input layer is the layer in which the first operation is performed among the plurality of layers, and the output layer is the layer in which the last operation is performed among the plurality of layers. The intermediate layer may be a layer disposed between the input layer and the output layer.

A related art image processing device applies the same color conversion matrix to an entire image. This method merely shifts the color domain of the whole image and cannot adjust different intensities for each color. On the other hand, the image processing device 100, according to some example embodiments, may achieve an image with optimal color by applying different color conversion matrices based on the color of each pixel in the image.

Figure 2A:
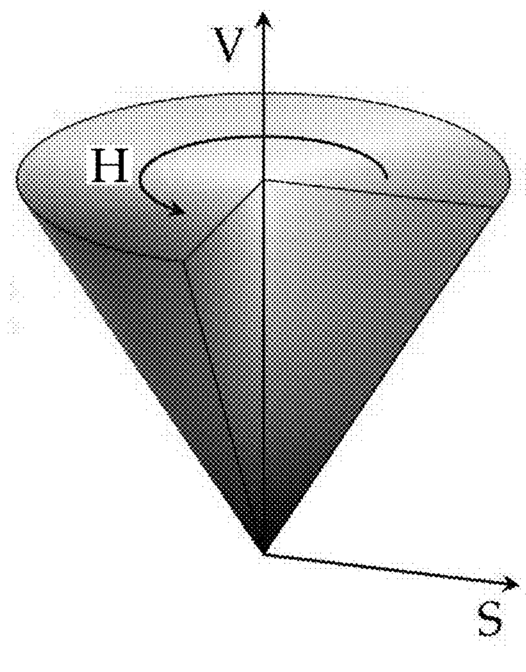
FIG. 2A is a diagram illustrating a general color space area.
Figure 2B:
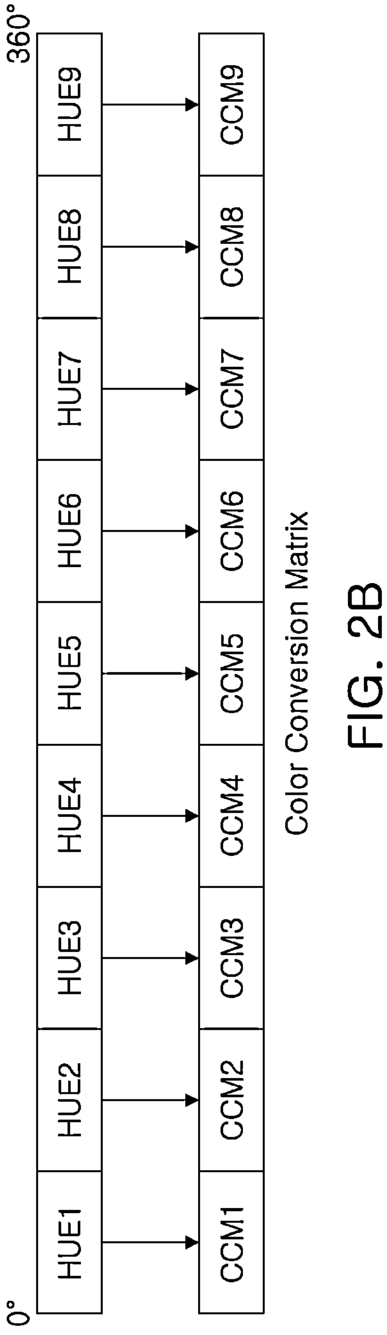
FIG. 2B is a diagram illustrating color conversion matrices corresponding to a color space area according to some example embodiments.

FIG. 2A is a diagram illustrating a general color space region, and FIG. 2B is a diagram exemplarily showing color conversion matrices corresponding to color space areas, according to some example embodiments. Referring to FIG. 2A, a Hue, Saturation, Value (HSV) domain is illustrated. Hue H (in other words, 'color') is determined by the length of the wavelength (frequency) of light. In the case of visible light, if the wavelength is long, the visible light is in the red series, and if the wavelength is short, the visible light is in the purple series. Saturation S indicates the purity of a color, that is, the degree of clarity and turbidity of a color. For example, in the case of a pure color, the saturation is high, and the more colors are mixed, the lower the saturation, resulting in gray. Value V (in other words, 'Intensity') indicates the lightness and darkness of a color. Brightness is determined by the amplitude of light. For example, when the amplitude is large, the brightness (energy) of the light increases.

As illustrated in FIG. 2B, the color conversion matrices according to example embodiments are different according to color space regions. For example, a hue value may be divided into 9 parts between 0° and 360°. Different color conversion matrices CCM1 to CCM9 corresponding to color gamut indices HUE1 to HUE9 may be set according to hue values. In other words, the hue values are used as color gamut indices.

In some example embodiments, the color regions illustrated in FIG. 2B are divided into 9 parts, and different color conversion matrices exist for each color region. In an example embodiment, color space regions, that is, color gamuts, may be equally divided according to hue values. According to some example embodiments, the color gamut space may be divided in a manner without uniformity according to hue values. The image processing device 100 according to some example embodiments may have different numbers of color conversion matrices using various techniques and methods according to pixel values in the HSV domain.

Figure 3:
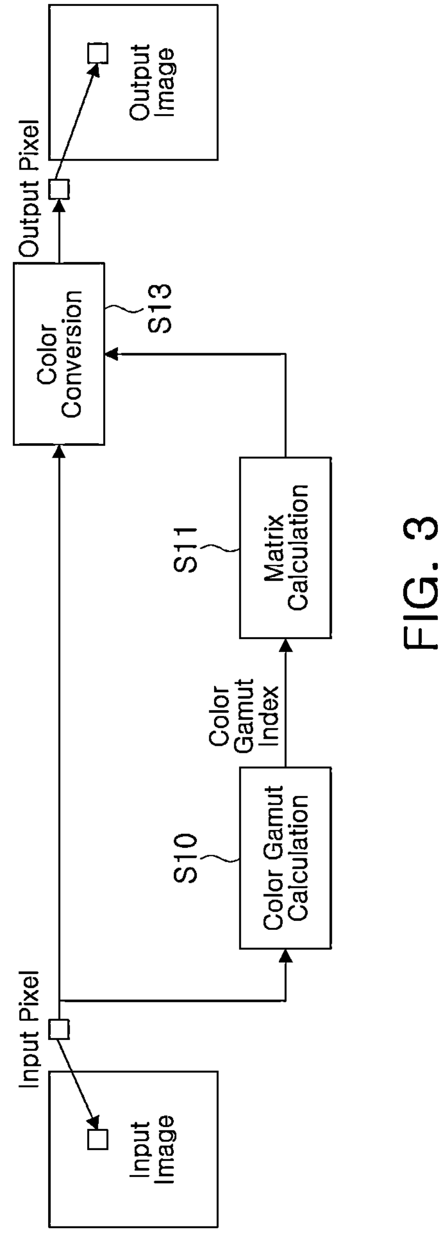
FIG. 3 is a diagram conceptually illustrating an image processing operation of the image processing device, according to some example embodiments.

FIG. 3 is a diagram conceptually illustrating an image processing operation of the image processing device 100 according to some example embodiments. Referring to FIG. 3, the image processing operation of the image processing device 100 may include a process of calculating a color gamut (S10), a process of calculating a matrix (S11), and a process of color conversion (S12).

In the process of calculating the color gamut (S10), a color gamut to which different color conversion matrices are applied according to hue values is set, it is determined which color gamut the input pixel is included in, and a color gamut corresponding to the color gamut is determined. Color gamut index (e.g., HUE1 to HUE9 of FIG. 2B) values may be output. In this case, the condition and number of color gamuts may be set by the user. For example, in the process of calculating the color gamut (S10), nine color gamuts may be set according to hue values as illustrated in FIG. 2B.

In the process of calculating the matrix (S11), a color conversion matrix to be applied according to the color gamut may be calculated. In an example embodiment, the matrix for each color gamut may be converted in a desired direction for each color gamut. A matrix for each color gamut may be set by a user. In an example embodiment, when an input pixel is located near the border of a plurality of color gamuts, color conversion matrices corresponding to the plurality of color gamuts may be interpolated to calculate a final color conversion matrix.

The color conversion process (S12) may receive an input pixel, perform a color conversion operation on the input pixel using a color conversion matrix, and output an output pixel according to a result of the execution. For example, in the color conversion process (S12), color conversion of the input pixel may be performed through 3×3 matrix multiplication as illustrated in the following equation.

$$\begin{bmatrix} R_{out} \\ G_{out} \\ B_{out} \end{bmatrix} = \begin{bmatrix} m_{11} & m_{12} & m_{13} \\ m_{21} & m_{22} & m_{23} \\ m_{31} & m_{32} & m_{33} \end{bmatrix} \times \begin{bmatrix} R_{in} \\ G_{in} \\ B_{in} \end{bmatrix} \quad \text{[Equation 1]}$$

In Equation 1 above, the input pixels ($R_{in}$, $G_{in}$, and $B_{in}$) and the output pixels (Rout, Gout, and Bout) are RGB type signals. The image display device 100 uses a 3×3 color conversion matrix ($m_{11}$ to $m_{33}$) so that the color gamut of the input pixels ($R_{in}$, $G_{in}$, and $B_{in}$) is linearly expanded to the color gamut of the image display device 100. By performing transformation, output pixels ($R_{out}$, $G_{out}$, and $B_{out}$) may be obtained.

In some example embodiments, the image processing device 100 may additionally adjust a color conversion matrix using segmentation information and saturation values.

Figure 4:
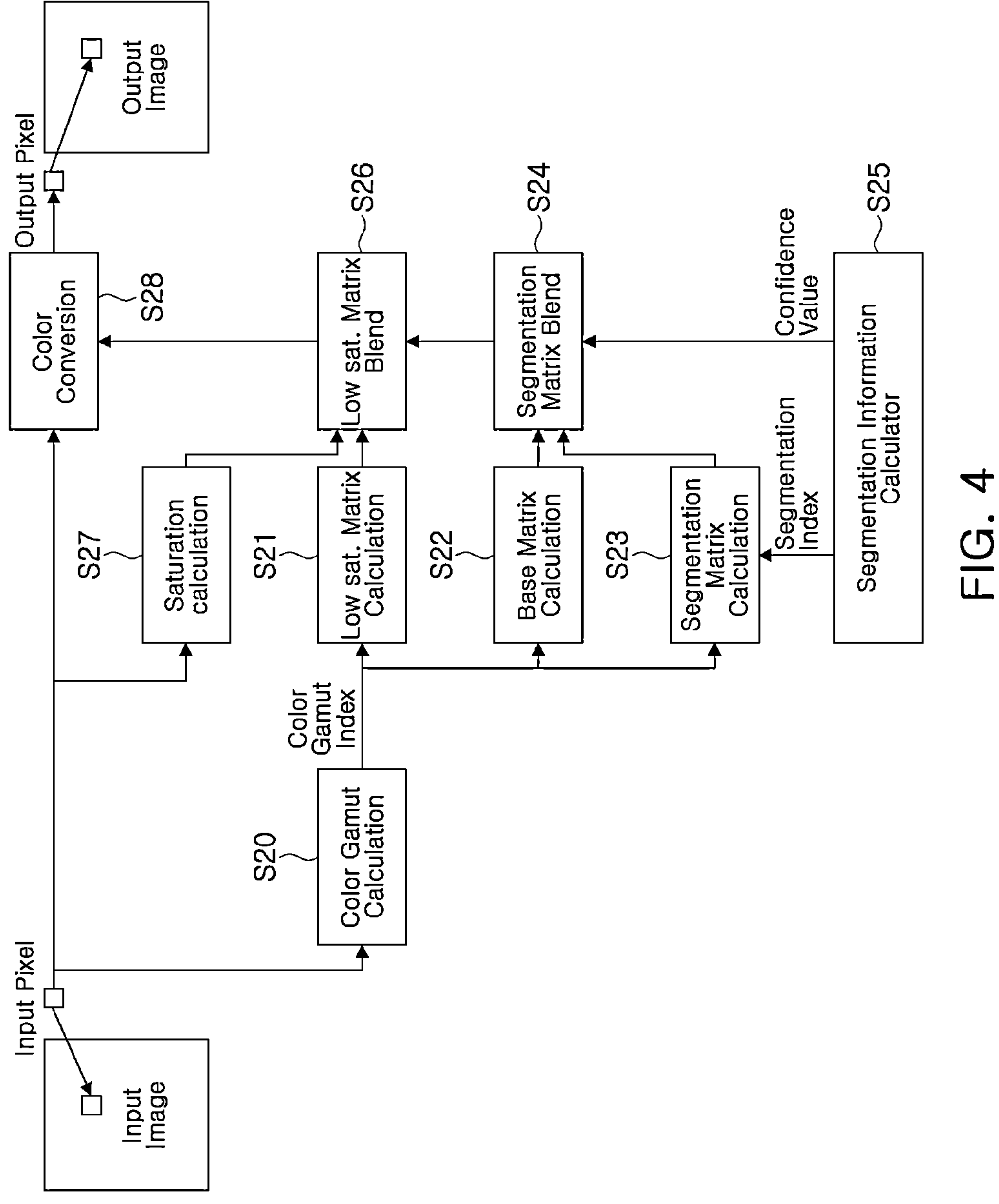
FIG. 4 is a diagram illustrating an example of a color conversion operation of the image processing device, according to some example embodiments.

FIG. 4 is a diagram illustrating a color conversion operation of the image processing device 100 according to some example embodiments.

Referring to FIG. 4, the color conversion operation of the image processing device 100 according to some example embodiments may include processes of calculating a color gamut (S20), calculating a low saturation matrix (S21), and calculating a base matrix (S22), calculating a segmentation matrix (S23), blending the segmentation matrix (S24), calculating segmentation information (S25), blending a low saturation matrix (S26), calculating a saturation (S27) and a color conversion process (S28).

In the process of calculating the color gamut (S20), a color gamut to which different conversion matrices are applied according to hue values may be set, and an index value corresponding to an input pixel may be output. For the number of color gamuts and the number of indices, values divided into 9 uniformly within the range of hue values (Hue Value of HSV domain) may be used.

In the process of calculating the low saturation matrix (S21), the saturation value of the input pixel (Saturation Value of HSV domain) may be calculated. In the process of calculating the low saturation matrix (S21), a transformation matrix to be applied according to the color gamut may be calculated when the saturation value of the pixel is low. In this case, the matrix for each color gamut may be set by the user so that each color gamut is converted in a desired direction. When an input pixel is located near the border of a plurality of color gamuts, a final matrix may be calculated by interpolating matrices corresponding to the plurality of color gamuts near the border.

In the process of calculating the base matrix (S22), a transformation matrix to be applied according to the color gamut may be calculated. The matrix for each color gamut may be set by a user so that each color gamut is converted in a desired direction. When an input pixel is located near the border of a plurality of color gamuts, a final matrix may be calculated by interpolating matrices corresponding to the plurality of color gamuts near the border.

In the process of calculating the segmentation matrix (S23), a transformation matrix to be applied according to the color gamut and segmentation index may be calculated.

In the process of blending the segmentation matrix (S24), the base matrix and the segmentation matrix may be blended in a weighted average method using a confidence value as a blending weight.

In the process of calculating segmentation information (S25), segmentation information according to a position of pixels within the input image may be calculated and the calculated segmentation information may be output. In this case, the segmentation information may include an index value and a confidence value for the corresponding segmentation. In some example embodiments, the segmentation information may include information on a photographing target. Different color conversion matrices may be applied according to the photographing subject.

In the process of blending the low saturation matrix (S26), the blended matrix in which the base matrix and the segmentation matrix are blended and the low saturation matrix may be blended in a weighted average method using the saturation value as a blending weight.

In the color conversion process (S28), color conversion of the input image may be performed using the blended low saturation matrix.

FIG. 5 is a flowchart illustrating a color processing operation of the image processing device 100 according to some example embodiments. Referring to FIG. 5, the image processing device 100 may perform an image processing operation as follows.

The image processing device 100 may receive an input image and calculate a hue value for the received input image (S110). The image processing device 100 may select a color conversion matrix according to the calculated hue values (S120). For example, the selected color conversion matrix may be any one of a plurality of matrices different from each other according to the calculated hue values. Thereafter, the image processing device 100 may perform color conversion on the input pixel using the selected color conversion matrix (S130).

In an example embodiment, nine color gamuts may be uniformly distinguished according to hue values. In some example embodiments, a saturation value of an input image is calculated, and a low saturation matrix may be calculated when the saturation value is lower than a threshold value. In some example embodiments, a base matrix corresponding to a hue value may be calculated, a segmentation matrix may be calculated according to a color gamut and a segmentation index, and the base matrix and segmentation matrix may be blended using the segmentation information. In some example embodiments, the blended segmentation matrix and the low saturation matrix are blended in a weighted average method using the saturation value as a blending weight, and the color conversion matrix may be calculated using the blended low saturation matrix.

FIG. 6 is a flowchart exemplarily illustrating a segmentation processing operation of the image processing device 100 according to some example embodiments. Referring to FIG. 6, an image processing operation of the image processing device 100 may proceed as follows.

The image processing device 100 may receive segmentation information for image processing of the input image (S210). In this case, the segmentation information may include information about a pixel location within an input image and a value indicating confidence thereof. In some example embodiments, segmentation information may be received from the outside of the image processing device 100. In some example embodiments, segmentation information may be calculated inside the image processing device 100. The image processing device 100 may blend the segmentation matrix using segmentation information (S220). Afterwards, the image processing device 100 may perform color conversion using the blended segmentation matrix (S230).

FIG. 7 is a flowchart illustrating a saturation processing operation of the image processing device 100 according to some example embodiments. Referring to FIG. 7, an image processing operation of the image processing device 100 may proceed as follows.

The image processing device 100 may determine whether the input image is a low saturation image (S310). When the saturation of the input image is less than or equal to a reference value, the image processing device 100 may blend a low saturation matrix according to a predetermined method (S320). Afterwards, the image processing device 100 may perform color conversion using the blended low saturation matrix (S330).

Figure 8:
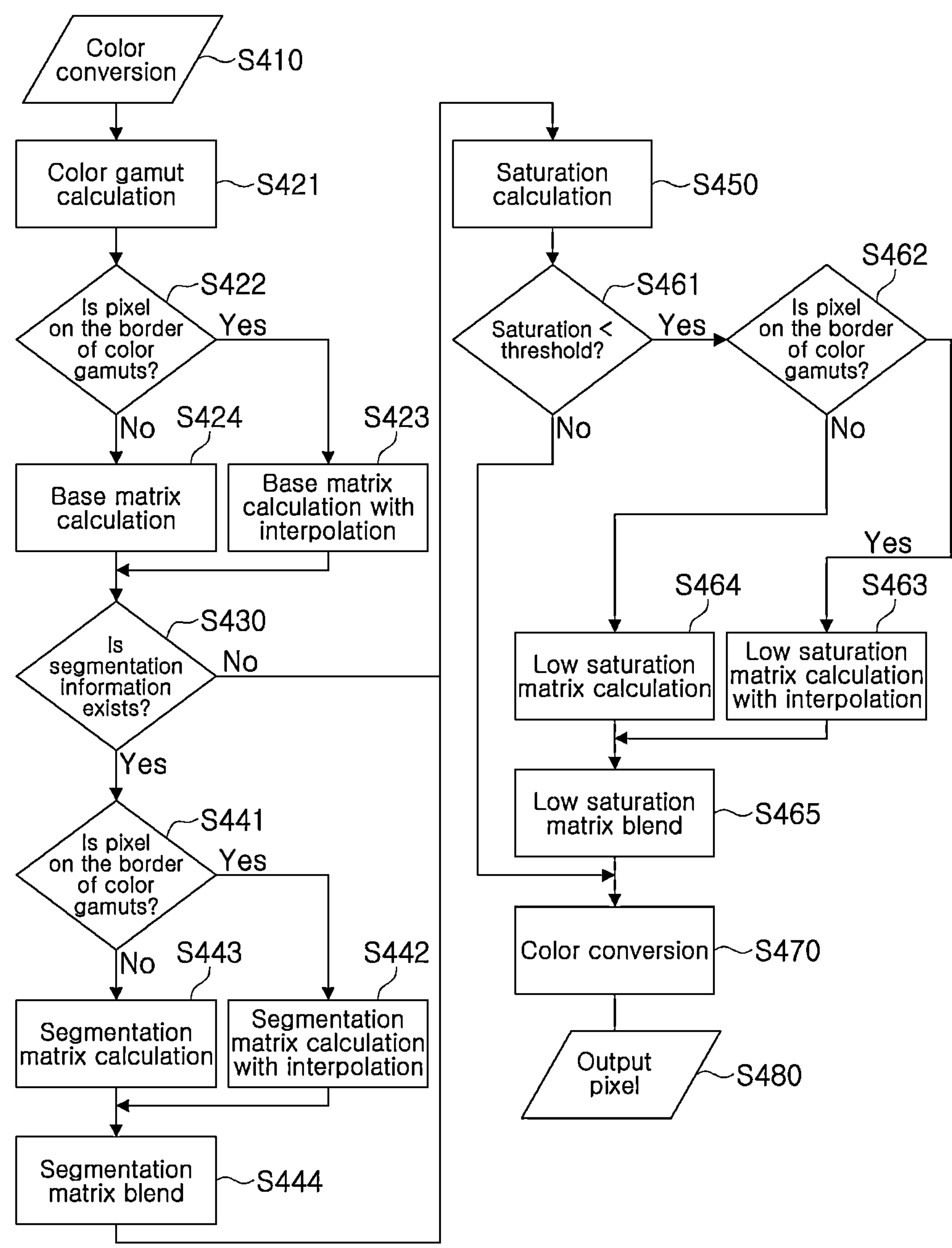
FIG. 8 is a flowchart illustrating n operation of the image processing device, according to some example embodiments.

FIG. 8 is a flowchart illustrating the operation of the image processing device 100 according to some example embodiments. Referring to FIGS. 1 to 8, the image processing device 100 may perform a color conversion operation as follows. For example, in some example embodiments, the one or more processor(s) 120 may access the memory device 110 and execute the color conversion module 111 to perform the color conversion operation described below.

The one or more processor(s) 120 may execute the color conversion module 111 to receive pixels (S410). The one or more processor(s) 120 may execute the color conversion module 111 to calculate a color gamut of an input pixel (S421). The one or more processor(s) 120 may execute the color conversion module 111 to determine whether the input pixel exists near the border of the color gamut (S422).

If the input pixel exists near the border of the color gamut (S422, Yes), the one or more processor(s) 120 may execute the color conversion module 111 to calculate a base matrix using interpolation (S423). For example, when a pixel color is located at the border of multiple color gamuts, base matrices may be interpolated for each color gamut. On the other hand, when the input pixel does not exist near the border of the color gamut (S422, No), the one or more processor(s) 120 may execute the color conversion module 111 to calculate a base matrix (S424). For example, when the input pixel does not exist near the border of the gamut, a base matrix set for the calculated gamut may be selected.

Subsequently, the one or more processor(s) 120 may execute the color conversion module 111 to determine whether segmentation information exists (S430). If the segmentation information exists (S430, Yes), the one or more processor(s) 120 may execute the color conversion module 111 to determine whether the input pixel is near the border of the color gamut (S441). If the input pixel is near the border of the color gamut (S441, Yes), the one or more processor(s) 120 may execute the color conversion module 111 to calculate a segmentation matrix using interpolation (S442). For example, if segmentation information exists, the color conversion module 111 may blend the segmentation matrix. The color conversion module 111 may read matrices for all color gamuts set for segmentation indices. When pixel colors are located near the boundaries of a plurality of color gamuts, the one or more processor(s) 120 may execute the color conversion module 111 to interpolate matrices set for each color gamut. On the other hand, when the input pixel does not exist near the border of the color gamut (S441, No), the one or more processor(s) 120 may execute the color conversion module 111 to calculate a segmentation matrix (S443). For example, when an input pixel does not exist near the border of a color gamut, the one or more processor(s) 120 may execute the color conversion module 111 to select a matrix set for the corresponding color gamut.

After that, the one or more processor(s) 120 may execute the color conversion module 111 to blend the segmentation matrix (S444). For example, the one or more processor(s) 120 may execute the color conversion module 111 to blend a base matrix and a segmentation matrix in a weighted average manner by using a confidence value as a blending weight.

After that, the one or more processor(s) 120 may execute the color conversion module 111 to calculate saturation of the input pixel (S450). The one or more processor(s) 120 may execute the color conversion module 111 to determine whether the calculated saturation value is lower than a threshold value (S461). When the saturation value is lower than the threshold value (S461, Yes), the one or more processor(s) 120 may execute the color conversion module 111 may blend the low saturation matrix. In this case, the threshold value may be set by the user.

If the saturation value is lower than the threshold value (S461, Yes), the one or more processor(s) 120 may execute the color conversion module 111 to determine whether the input pixel exists near the border of color gamuts (S462). If the input pixel exists near the border (S462, Yes), the one or more processor(s) 120 may execute the color conversion module 111 to calculate a low saturation matrix using interpolation (S463). For example, when a pixel color is located near a border of a plurality of color gamuts, the one or more processor(s) 120 may execute the color conversion module 111 to interpolate matrices set for each color gamut. On the other hand, when the input pixel does not exist near the border of the color gamuts (S462, No), the one or more processor(s) 120 may execute the color conversion module 111 to calculate the low saturation matrix (S464). For example, when an input pixel does not exist near the border of a color gamut, the one or more processor(s) 120 may execute the color conversion module 111 to select a matrix set for the corresponding color gamut.

After that, the one or more processor(s) 120 may execute the color conversion module 111 to blend the low saturation matrix (S465). For example, the one or more processor(s) 120 may execute the color conversion module 111 to use the saturation value as a blending weight to blend the base matrix and the segmentation matrix in a weighted average manner.

Thereafter, the one or more processor(s) 120 may execute the color conversion module 111 to perform color conversion on the input pixel using the color conversion matrix, low saturation matrix, and segmentation matrix (S470). For example, the one or more processor(s) 120 may execute the color conversion module 110 to perform pixel color conversion by performing 3×3 matrix multiplication on an input pixel using a final calculated matrix. The one or more processor(s) 120 may execute the color conversion module 111 to output color-converted output pixels (S480).

Figure 9A:
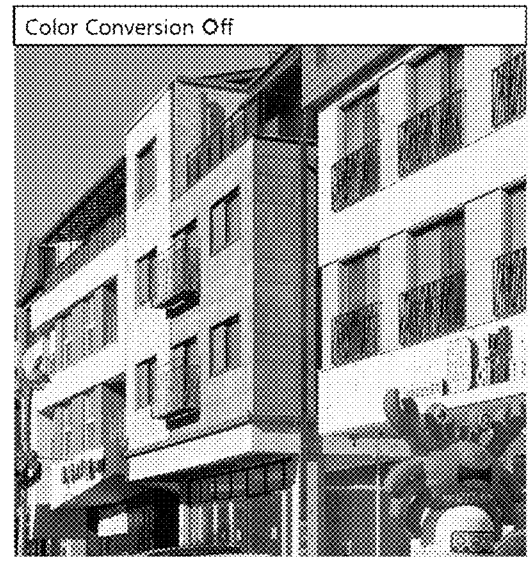
FIG. 9A is a diagram in which a color conversion mode is turned off in the image processing device according to some example embodiments.
Figure 9B:
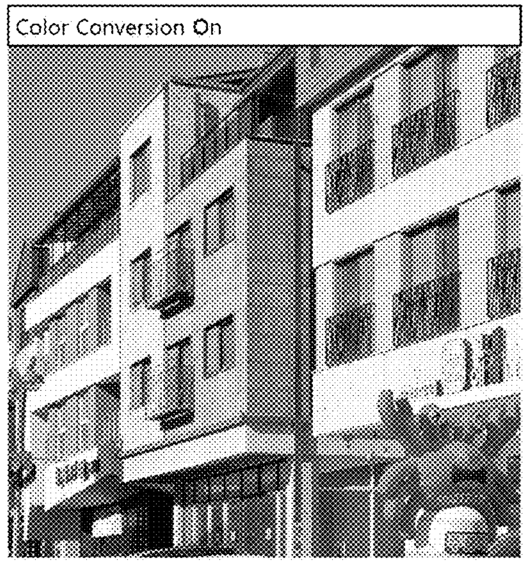
FIG. 9B is a diagram in which a color conversion mode is turned on in the image processing device according to some example embodiments.

FIG. 9A is a diagram in which a color conversion mode is turned off in the image processing device 100 according to some example embodiments, and FIG. 9B is a diagram in which a color conversion mode is turned on in the image processing device 100 according to some example embodiments. The image processing device 100 according to some example embodiments may classify 9 color gamuts according to hue values and perform color conversion using different matrices for each color gamut. As illustrated in FIG. 9B, each color such as red and blue may be output with different emphasis.

Figure 10A:
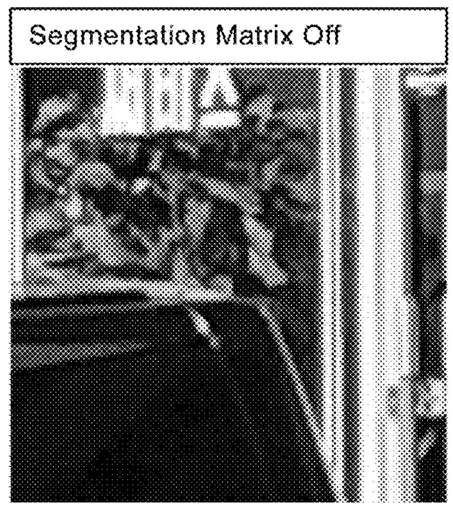
FIG. 10A shows the image processing device with the segmentation matrix mode turned off according to some example embodiments.
Figure 10B:
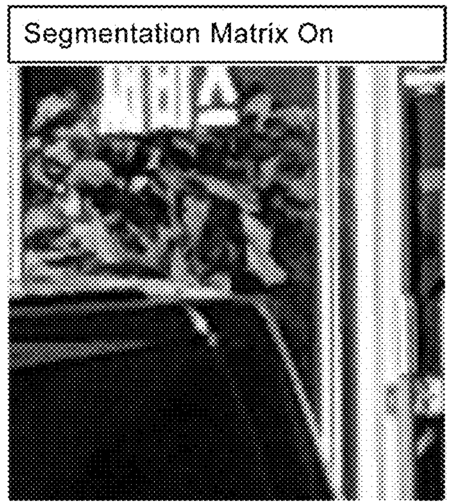
FIG. 10B shows the image processing device with the segmentation matrix mode turned on according to some example embodiments.

FIG. 10A is a diagram in which the segmentation matrix mode is turned off in the image processing device 100 according to some example embodiments, and FIG. 10B is a diagram in which the segmentation matrix mode is turned on in the image processing device 100 according to some example embodiments. As illustrated in FIG. 10B, the image processing device 100 according to some example embodiments may increase the intensity of the green color for the grass object using externally calculated segmentation information.

Figure 11A:
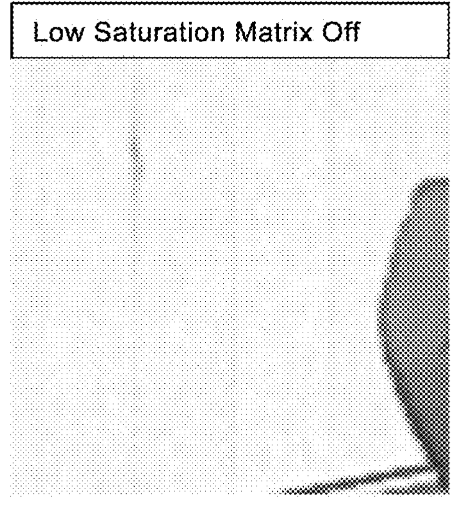
FIG. 11A is a diagram in which the low saturation matrix mode is turned off in the image processing device according to some example embodiments.
Figure 11B:
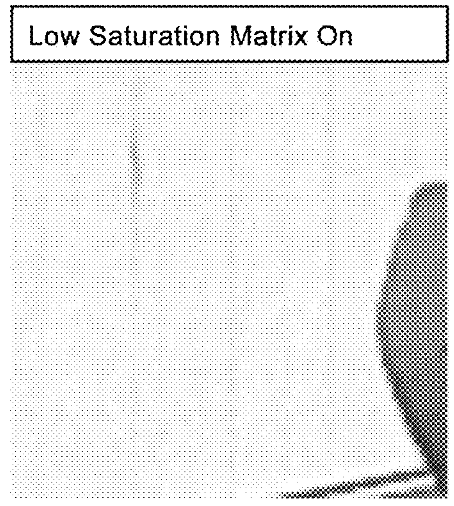
FIG. 11B is a diagram in which the low saturation matrix mode is turned on in the image processing device according to some example embodiments.

FIG. 11A is a diagram in which the low saturation matrix mode is turned off in the image processing device 100 according to some example embodiments, and FIG. 11B is a diagram in which the low saturation matrix mode is turned on in the image processing device 100 according to some example embodiments. When color conversion is strongly used, a side effect of color distortion in an achromatic (white, gray) area may occur. As illustrated in FIG. 11B, the image processing device 100 according to some example embodiments may suppress color distortion by overlapping and using an additional low saturation matrix for a low saturation pixel.

The image processing method according to some example embodiments is applicable to mobile devices.

Figure 12:
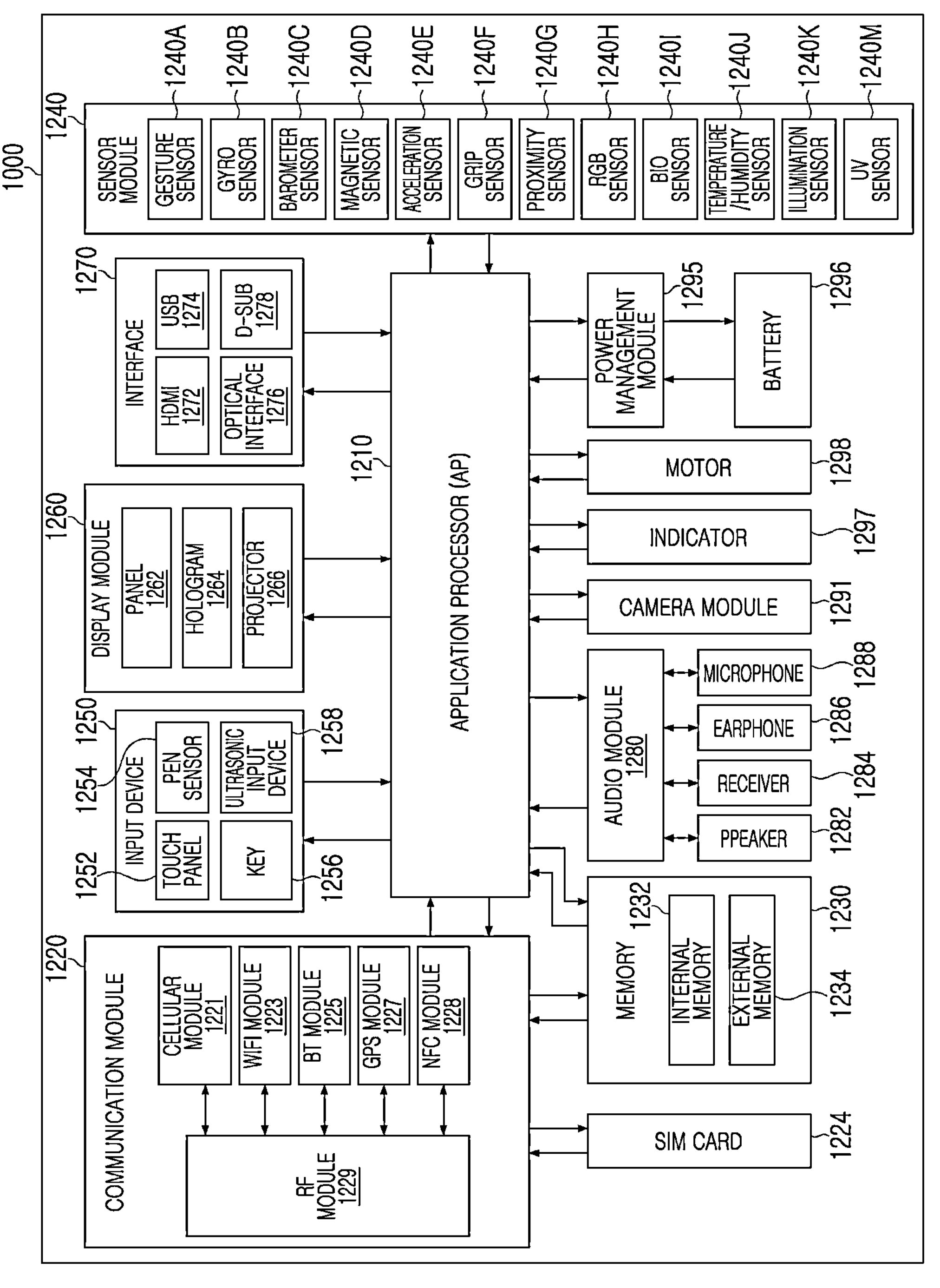
FIG. 12 is a diagram illustrating an example of a mobile device, according to some example embodiments.

FIG. 12 is a diagram illustrating a mobile device 1000 according to some example embodiments by way of example. Referring to FIG. 12, the mobile device 1000 may include at least one processor 1210, a Subscriber Identification Module (SIM) card 1214, a memory 1220, a communication module 1230, a sensor module 1240, a user input module 1250, a display module 1260, and a module (1270), audio codec (1280), camera module (1291), power management module (1295), battery (1296), indicator (1297) or motor (1298).

The at least one processor 1210 may include at least one application processor (AP) 1211 and at least one communication processor (CP) 1213. Although the AP 1211 and CP 1213 are illustrated as being included in the processor 1210, the AP 1211 and CP 1213 may be included in different IC packages, respectively. In an example embodiment, the AP 1211 and the CP 1213 may be included in one IC package. The at least one processor 1210 may be implemented to perform an optimal color conversion operation according to a color gamut in the HSV domain as described with reference to FIGS. 1 to 11. In this case, the color gamuts may be set by the user.

The AP 1211 controls a plurality of hardware or software components connected to the AP 1211 by driving an operating system or an application program, and various data processing and calculations including multimedia data may be performed. The AP 1211 may be implemented as, for example, a system on chip (SoC). In an example embodiment, the processor 1210 may further include a graphic processing unit (GPU).

The CP 1213 may perform a function of managing a data link and converting a communication protocol in communication between an electronic device including the mobile device 1000 and other electronic devices connected through a network. The CP 1213 may be implemented as an SoC, for example. In an example embodiment, the CP 1213 may perform at least part of a multimedia control function. The CP 1213 may perform identification and authentication of a terminal within a communication network using, for example, a subscriber identification module (e.g., the SIM card 1214). In some example embodiments, the CP 1213 may provide services such as voice call, video call, text message, or packet data to the user. Also, the CP 1213 may control data transmission/reception of the communication module 1230. In FIG. 12, components such as the CP 1213, the power management module 1295, or the memory 1220 are illustrated as separate components from the AP 1211, and in an example embodiment, the AP 1211 may be implemented to include at least some of the aforementioned components (e.g., the CP 1213).

In an example embodiment, the AP 1211 or CP 1213 may load and process commands or data received from at least one of a non-volatile memory or other components connected thereto into the volatile memory. In some example embodiments, the AP 1211 or CP 1213 may store data received from at least one of the other components or generated by at least one of the other components in a non-volatile memory.

The SIM card 1214 may be a card implementing a subscriber identification module, inserted into a slot formed at a designated location of an electronic device, or embedded in a device in the form of a chip, or SIM information without a physical form may be stored in a part of the device (e.g., electronic SIM, virtual SIM, or soft SIM). The SIM card 1214 may include unique identification information (e.g., integrated circuit card identifier (ICCID)) or subscriber information (e.g., international mobile subscriber identity (IMSI)). SIM card 1214 may operate in conjunction with communication module 1230.

The memory 1220 may include an internal memory 1222 and/or an external memory 1224. The internal memory 1222 may include, for example, volatile memory (e.g., dynamic RAM (DRAM), static RAM (SRAM), synchronous dynamic RAM (SDRAM), etc.) or non-volatile memory (e.g., non-volatile memory). For example, at least one of OTPROM (one time programmable ROM), PROM (programmable ROM), EPROM (erasable and programmable ROM), EEPROM (electrically erasable and programmable ROM), mask ROM, flash ROM, NAND flash memory, NOR flash memory, etc.) may contain one. In an example embodiment, the internal memory 1222 may take the form of a solid state drive (SSD).

The external memory 1224 may further include a flash drive, for example, a compact flash (CF), secure digital (SD), micro secure digital (Micro-SD), mini secure digital (Mini-SD), extreme (xD) digital) or memory stick, etc.

The communication module 1230 may include a wireless communication module 1231 or an RF module 1234. The wireless communication module 1231 may include, for example, Wi-Fi 1233, BT 1235, GPS 1237, or NFC 1239. For example, the wireless communication module 1231 may provide a wireless communication function using a radio frequency. Additionally, the wireless communication module 1231 is a network interface ((e.g., LAN card) or modem, etc.

The RF module 1234 may be responsible for transmitting and receiving data, for example, RF signals or called electronic signals. Although not illustrated, the RF module 1234 may include, for example, a transceiver, a power amplification module (PAM), a frequency filter, or a low noise amplifier (LNA). In some example embodiments, the RF module 1234 may further include a component for transmitting and receiving electromagnetic waves in free space in wireless communication, for example, a conductor or a wire.

The sensor module 1240 may include at least one of, for example, a gesture sensor 1240A, a gyro sensor 1240B, an air pressure sensor 1240C, a magnetic sensor 1240D, an acceleration sensor 1240E, a grip sensor 1240F, a proximity sensor 1240G, an RGB (red, green, blue) sensor 1240H, a bio sensor 1240I, a temperature/humidity sensor 1240J, an illuminance sensor 1240K or an ultra violet (UV) sensor (1240M). The sensor module 1240 may measure a physical quantity or detect an operating state of an electronic device and convert the measured or sensed information into an electrical signal. In some example embodiments, the sensor module 1240 may include, for example, an E-nose sensor, an Electromyography (EMG) sensor, an Electroencephalogram (EEG) sensor, an Electrocardiogram (ECG) sensor, a Photoplethysmography (PPG) sensor, a Heart Rate Monitor (HRM), a perspiration sensor, or a fingerprint sensor. The sensor module 1240 may further include a control circuit for controlling at least one sensor included therein.

The user input module 1250 may include a touch panel 1252, a pen sensor 1254, a key 1256, or an ultrasonic input device 258. The touch panel 1252 may recognize a touch input in at least one of, for example, a capacitive type, a pressure-sensitive type, an infrared type, or an ultrasonic type. In some example embodiments, the touch panel 1252 may further include a controller. In the case of a capacitive type, proximity recognition as well as direct touch is possible. The touch panel 1252 may further include a tactile layer. In this case, the touch panel 1252 may provide a tactile response to the user.

The pen sensor 1254 may be implemented, for example, using the same or similar method as receiving a user's touch input or using a separate recognition sheet. As the key 1256, for example, a keypad or a touch key may be used. The ultrasonic input device 1258 is a device that may check data by detecting sound waves with a microphone (e.g., the microphone 1288) in a terminal through a pen that generates an ultrasonic signal, and wireless recognition is possible. In an example embodiment, the mobile device 1000 may receive a user input from an external device (e.g., a network, computer, or server) connected to the mobile device 1230 using the communication module 1230.

The display module 1260 may include a panel 1262 or a hologram 1264. The panel 1262 may be, for example, a liquid crystal display (LCD) or an active-matrix organic light emitting diode (AM-OLED). The panel 1262 may be implemented as flexible, transparent, or wearable, for example. The panel 1262 and the touch panel 1252 may be configured as one module. The hologram 1264 may show a 3D image in the air by using light interference. In an example embodiment, the display module 1260 may further include a control circuit for controlling the panel 1262 or the hologram 1264.

The interface 1210 may include, for example, an HDMI 1212, a USB 1214, a projector 1216, or a D-sub (D-subminiature) 1218. In some example embodiments, the interface 1210 may include, for example, a multi-media card (SD/MMC) or an infrastructure-red data association (IrDA).

The audio codec 1280 may convert voice and electrical signals in both directions. The audio codec 1280 may convert voice information input or output through, for example, a speaker 1282, a receiver 1284, an earphone 1286, or a microphone 1288.

The camera module 1291 is a device capable of capturing images and videos, and in an example embodiment, may include at least one image sensor (e.g., a front lens or a rear lens), an image signal processor (ISP), or a flash LED.

The power management module 1295 may manage power of the mobile device 1000. Although not illustrated, the power management module 1295 may include, for example, a power management integrated circuit (PMIC), a charger integrated circuit (IC), or a battery fuel gauge. The PMIC may be mounted in, for example, an integrated circuit or a System on Chip (SoC) semiconductor. The charging method may be divided into wired and wireless. The charger IC may charge the battery and prevent overvoltage or overcurrent from flowing in from the charger. In an example embodiment, the charger IC may include a charger IC for at least one of a wired charging method and a wireless charging method. As the wireless charging method, for example, there is a magnetic resonance method, a magnetic induction method, or an electromagnetic wave method, and an additional circuit for wireless charging, for example, a circuit such as a coil loop, a resonance circuit, or a rectifier may be added.

The battery gauge may measure, for example, the remaining capacity of the battery 1296, voltage, current, or temperature during charging. The battery 1296 may generate electricity to supply power, and may be, for example, a rechargeable battery. The indicator 1297 may display a specified state of the mobile device 1000 or a part thereof (e.g., the AP 1211), such as a booting state, a message state, or a charging state. For example, a booting state, a message state, or a charging state may be displayed. The motor 1298 may convert electrical signals into mechanical vibrations. Although not illustrated, the mobile device 1000 may include a processing unit (e.g., GPU) for supporting mobile TV. The processing device for supporting mobile TV may process media data according to standards such as, for example, digital multimedia broadcasting (DMB), digital video broadcasting (DVB), or media flow.

Each of the aforementioned components of the hardware according to various embodiments of the present disclosure may be composed of one or more components, and the name of the corresponding component may vary depending on the type of electronic device. Hardware according to various embodiments may include at least one of the above-described components, and some components may be omitted or other additional components may be further included. In some example embodiments, some of the components of hardware may be combined to form one entity, so that the functions of the corresponding components before being combined may be performed in the same way.

The image processing method according to some example embodiments is applicable to an electronic device using a neural network.

Figure 13:
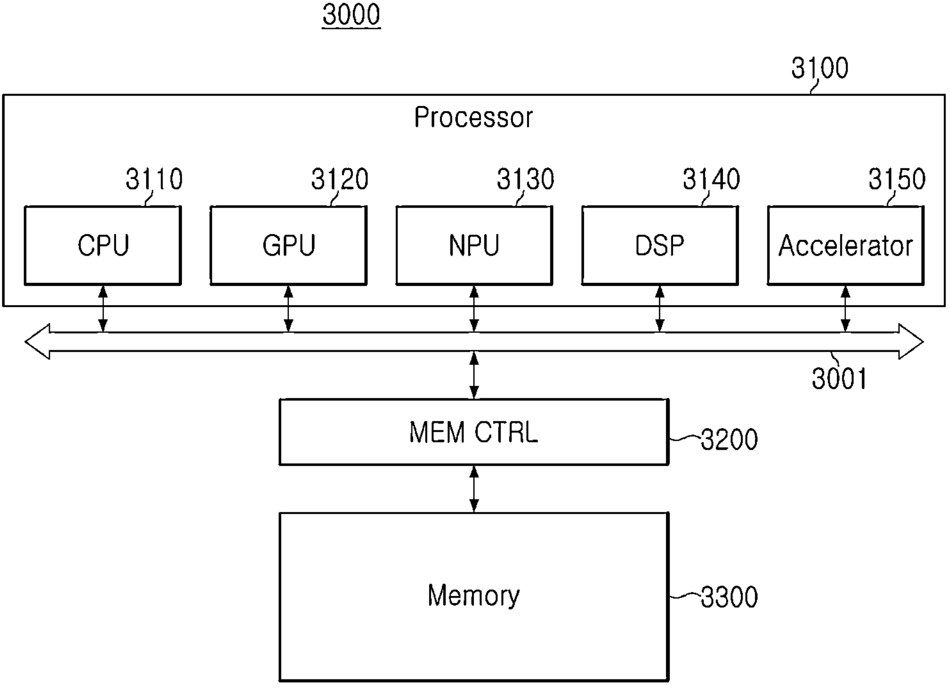
FIG. 13 is a diagram illustrating an electronic device 3000, according to some example embodiments.

FIG. 13 is a diagram illustrating an electronic device 3000 according to some example embodiments. Referring to FIG. 13, the electronic device 3000 may execute a neural network model. A neural network model is a model of a learning method in which the human brain processes information, and may refer to a model capable of accurately recognizing and discriminating objects or specific information in various user data such as audio, image, and video.

The electronic device 3000 may be a mobile system such as a mobile phone, a smart phone, a tablet personal computer (PC), a wearable device, a healthcare device, or an internet of things (IoT) device. However, the electronic device 3000 is not necessarily limited to a mobile system, and in some example embodiments may include in-vehicle equipment such as a personal computer, a laptop computer, a server, a media player, or a navigation device. automotive device), etc.

The electronic device 3000 may include a system bus 3001, a processor 3100, a memory controller 3200, and a memory device 3300. The system bus 3001 may support communication between the processor 3100, the memory controller 3200, and the memory device 3300.

The processor 3100 may perform a neural network operation using data stored in the memory device 3300. For example, neural network operation may include operations of reading data and weights for each node included in the neural network model, performing a convolution operation of data and weights, and storing or outputting an operation result. The image processing method according to some example embodiments, the processor 3100 may include heterogeneous computing devices that process and calculate data, such as a Central Processing Unit (CPU) 3110, a Graphic Processing Unit (GPU) 3120, a Neural Processing Unit (NPU) 3130, a Digital Signal Processor (DSP) 3140, an accelerator 3150, etc. In detail, the CPU 3110 may be a highly versatile computing device. The GPU 3120 may be an arithmetic unit optimized for parallel computation such as graphic processing. The NPU 3130 is an arithmetic unit optimized for neural network arithmetic, and may include logic blocks for executing unit arithmetic operations mainly used in neural network arithmetic, such as convolution. The DSP 3140 may be a computing device optimized for real-time digital processing of analog signals. The image processing method according to some example embodiments, the accelerator 3150 may be an arithmetic device for quickly performing a specific function.

The image processing method according to some example embodiments, when the processor 3100 executes the neural network model, various hardware devices may operate together. For example, in order to execute a neural network model, not only the NPU 3130 but also heterogeneous computing devices such as the CPU 3110 and the GPU 3120 may operate together. In some example embodiments, the memory controller 3200 and the data bus 3001 may operate to read input data of the neural network model and store output data.

The memory device 3300 may store data necessary for the processor 3100 to perform a neural network operation. For example, one or more neural network models that may be executed by the processor 3100 may be loaded into the memory device 3300. Also, input data and output data of the neural network model may be stored in the memory device 3300. The memory device 3300 may include volatile memory such as dynamic random access memory (DRAM), synchronous DRAM (SDRAM), static RAM (SRAM), and resistive RAM (RRAM), and may include non-volatile memory such as flash memory.

The memory controller 3200 may control an operation of storing data received from the processor 3100 in the memory device 3300 and an operation of outputting data stored in the memory device 3300 to the processor 3100.

The electronic device 3000 according to some example embodiments may include a hardware layer, a system software layer, and an application layer. The hardware layer is the lowest layer of the electronic device 3000 and may include hardware devices such as a system bus, a processor, and a memory controller. A processor may include heterogeneous computing units, such as CPUs, GPUs, NPUs, DSPs, and other accelerators. The system software layer may manage hardware devices of the hardware layer and provide an abstracted platform. For example, the system software layer may run a Linux-like kernel. The system software layer may include a neural network model executor. The neural network model executor may execute the neural network model using hardware devices operating at a predetermined operating frequency. The image processing method according to some example embodiments, the system software layer may be driven by a processor. For example, a system software layer may be driven by a CPU. However, it should be understood that the computing unit on which the system software layer may run is not limited to the CPU.

The application layer may run on the system software layer and may include a plurality of neural network models and other applications. For example, other applications may include a camera application. In an example embodiment, the camera application may include an application that performs the color conversion module function described with reference to FIGS. 1 to 12. A plurality of neural network models include a model for detecting an object included in an image frame acquired by a camera application, a model for identifying what the detected object is, a model for detecting a target region in an image frame, and a model for identifying the detected target region. The plurality of neural network models may include a model that classifies the identified target areas according to semantics such as people, cars, trees, and the like. However, it should be understood that the types of neural network models and other applications are not limited thereto.

In some example embodiments, other applications may be simultaneously executed when the neural network model is executed, and a plurality of neural network models may be simultaneously executed. For example, when the electronic device 3000 is a mobile system, a neural network model for detecting an object may be executed simultaneously with executing a camera application. When multiple applications, including neural network models, are executed simultaneously, resource contention may occur in hardware devices.

In some example embodiments, the term "module" used herein may refer to a unit including one or a combination of two or more of, for example, hardware, software, or firmware. A "module" may be interchangeably used with terms such as, for example, a unit, logic, logical block, component, or circuit. A "module" may be a minimum unit or part of an integrally formed part. A "module" may be a minimal unit or part thereof that performs one or more functions. A "module" may be implemented mechanically or electronically. For example, "module" may include at least one of Application-specific integrated circuit (ASIC) chips, field-programmable gate arrays (FPGAs), or programmable-logic devices that perform certain operations, known or to be developed. At least some of the devices (e.g., modules or functions thereof) or methods (e.g., operations) according to the example embodiment may be implemented as instructions stored in a computer-readable storage medium in the form of a program module. When an instruction is executed by a processor, one or more processors may perform a function corresponding to the instruction. A computer-readable storage medium may be, for example, a memory.

A computer-readable recording medium may include hard disk, floppy disk, magnetic media (e.g. magnetic tape), optical media (e.g. CD-ROM, Digital Versatile Disc (DVD), magneto-optical media) (e.g. floptical disk), hardware device (e.g. ROM, RAM, or flash memory), etc. In some example embodiments, the program command may include high-level language codes that may be executed by a computer using an interpreter or the like as well as machine language codes generated by a compiler. The hardware device described above may be configured to operate as one or more software modules to perform operations of various embodiments, and vice versa.

A module or program module according to some example embodiments may include at least one or more of the aforementioned components, some may be omitted, or additional components may be further included. Operations performed by modules, program modules, or other components according to various embodiments may be executed in a sequential, parallel, repetitive, or heuristic manner. Also, some actions may be executed in a different order, omitted, or other actions may be added.

The image processing method according to some example embodiments may be applied to electronic devices.

Figure 14:
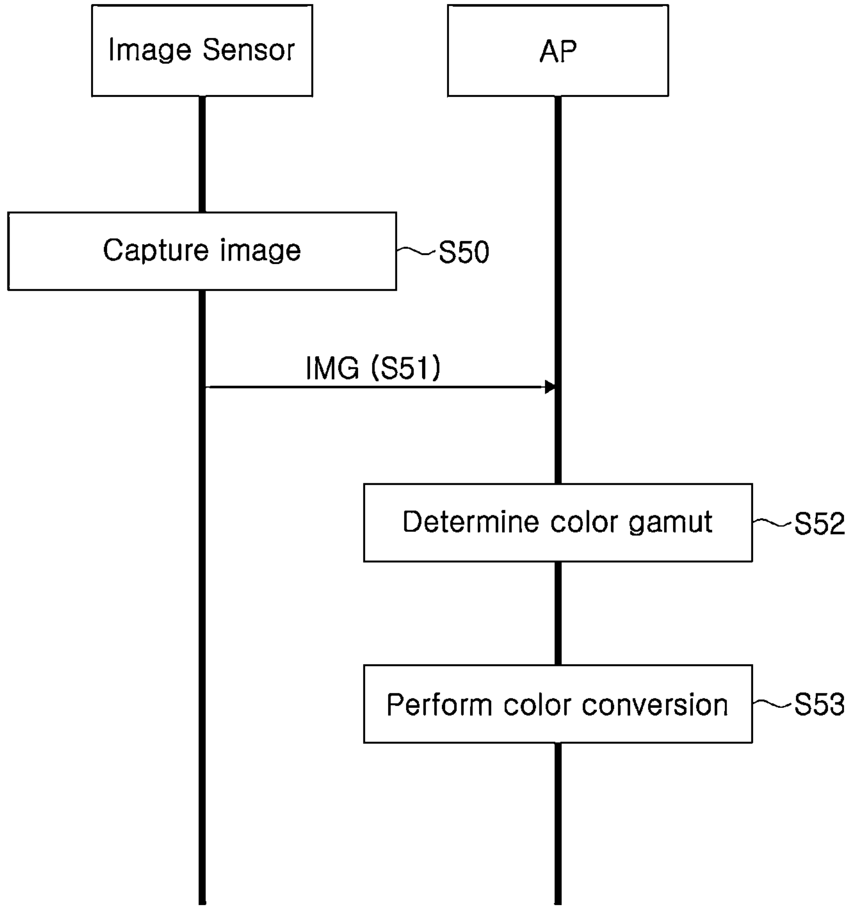
FIG. 14 is a ladder diagram exemplarily illustrating a color conversion process of an electronic device, according to some example embodiments.

FIG. 14 is a ladder diagram exemplarily illustrating a color conversion process of an electronic device according to some example embodiments. Referring to FIG. 14, an electronic device may include an image sensor and an application processor (AP). The image sensor may capture an image (S50). The obtained image IMG may be output to the AP (S51). The AP may determine whether the received image IMG is included in one of color gamuts on an HSV domain (S52). In an example embodiment, each of the color gamuts may be set by a user. The AP may perform color conversion according to the determined color gamut (S53).

In an example embodiment, the AP may classify color gamuts according to hue values in the HSV domain and color convert an input image by applying a color conversion matrix corresponding to the divided color gamuts. In an example embodiment, the AP may color-convert the image by applying different segmentation matrices according to segmentation information indicating the location of the image. In an example embodiment, the AP may color-convert the image by calculating a saturation value of the image and applying a low saturation matrix according to the saturation value. In an example embodiment, the color gamuts may be set by a user, and the electronic device may further include a display device displaying an output image on which a color conversion operation is performed.

The image processing method according to some example embodiments is applicable to an image signal processor (ISP).

Figure 15:
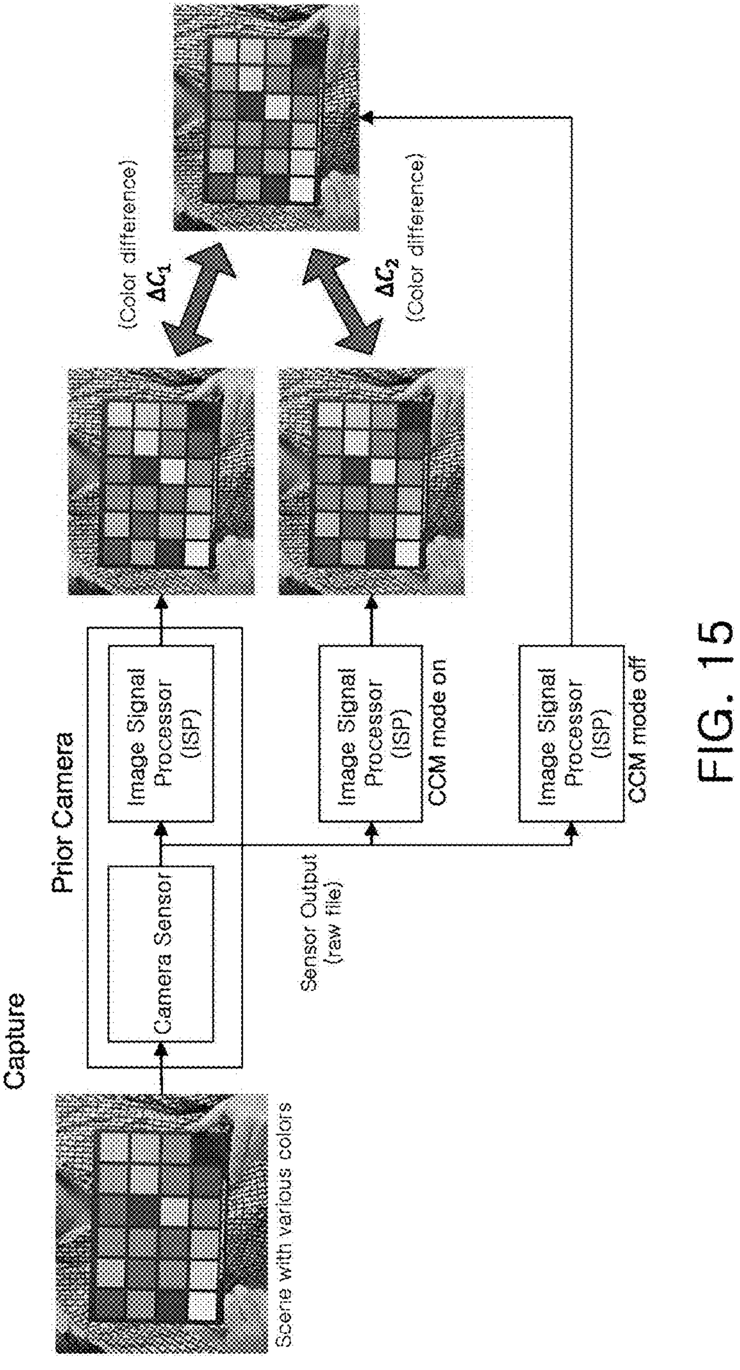
FIG. 15 is a diagram illustrating on/off of a color conversion matrix (CCM) mode in an image signal processor, according to some example embodiments.

FIG. 15 is a diagram illustrating on/off of a Color Conversion Matrix (CCM) mode in an image signal processor (hereinafter referred to as 'ISP') according to some example embodiments. As illustrated in FIG. 15, a scene (e.g., color chart) composed of various colors may be captured by a camera and an output image may be obtained. By using the raw file acquired by the existing camera as an input, each output image may be obtained when the Color Conversion Matrix (CCM) mode is turned on/off using the ISP according to the example embodiment.

An image signal processor (ISP) according to some example embodiments receives an image having a plurality of color charts, performs first color conversion on the image in a state in which the CCM mode is turned on, and turns off the CCM mode. In the off state, the second color conversion may be performed on the image. In this case, the color conversion matrix mode performs color conversion by applying different color conversion matrices according to the color gamut of the input pixel. In an example embodiment, the ISP according to some example embodiments may calculate a color gamut index for an image and calculate a corresponding color conversion matrix according to the calculated color gamut index.

In an example embodiment, the ISP calculates a gamut index for an image, calculates a base matrix corresponding to the gamut index, calculates a low saturation matrix corresponding to a saturation value of the image, and calculates a segmentation matrix according to the segmentation index. to the ISP may calculate, blend the base matrix and the segmentation matrix according to the confidence value of the segmentation index, and blend the blended segmentation matrix and the low saturation matrix according to the saturation value. In an example embodiment, the ISP may calculate a saturation value and receive segmentation information having a segmentation index and the confidence value. In an example embodiment, the ISP may interpolate base matrices corresponding to each color gamut when a pixel color is located near a border of a plurality of color gamuts.

The image processor (ISP) according to some example embodiments compares color differences $\Delta C_1$ and $\Delta C_2$ for each color area, and variation in difference values of $\Delta C_1$ and $\Delta C_2$ according to color areas may be large. This large variation is because different color conversions are performed for different color gamuts. In this case, the color difference may be reviewed for various domain values such as intensity and saturation.

An image processing device, an electronic device including the same, and an operation method according to some example embodiments may use different color conversion matrices for each color gamut as a base matrix for final color conversion. In some example embodiments, when situated on multiple color gamut boundaries, a base matrix may be calculated by interpolating several conversion matrices. In some example embodiments, different conversion matrices may be selected based on segmentation information, and the base matrix and the selected conversion matrix may be interpolated using the confidence value as a weight. In some example embodiments, a conversion matrix for low saturation pixels within each color gamut is reserved, and the base matrix and the conversion matrix may be interpolated using the saturation value as a weight.

In general, if various colors are strongly enhanced compared to the actual color of an object, different color conversions may be performed for each color, as in the various example embodiments described above. The various example embodiments allow for the comparison of enhancement intensities for different objects with similar colors and the assessment of enhancement intensity for low saturation colors. Related art color conversion methods apply the same color conversion matrix to the entire video. However, this approach simply shifts the color domain of the entire image and does not allow for detailed adjustments such as applying different intensity enhancements for each color. In the various example embodiments, different color processing for each image area is possible by applying distinct matrices based on color gamut, segmentation information, and saturation.

In some example embodiments, an image processing device and an operating method thereof according to some example embodiments, may convert colors using different color conversion matrices based on the color of each pixel. However, it should be understood that example embodiments are not limited to this. The image processing device and the operating method may convert color gamuts using different look-up tables for each pixel's color. In a method that employs such a lookup table for color gamut conversion, conversion values for multiple points in the input image's color gamut may be stored in the form of a lookup table, and color gamut conversion can be performed by interpolating the stored conversion values.

As described above, an image processing device, an electronic device including the same, and its operating method, according to some example embodiments, can perform color conversion using different color conversion matrices based on color gamuts.

An image processing device, according to some example embodiments, an electronic device containing the same, and its operating method perform color conversion using different color conversion matrices for respective colors, thus providing an optimal color perception for the user.

While example embodiments have been illustrated and described above, it will be apparent to those skilled in the art that modifications and variations could be made without departing from the scope of the present disclosure as defined by the appended claims.

What is claimed is:

1. An image processing device comprising:

a memory device; and at least one processor configured to access the memory device and execute a color conversion module to calculate a color gamut to which a color of each pixel of an input image belongs and perform color conversion of the each pixel by applying different color conversion matrices according to the color gamut.

2. The image processing device of claim 1, wherein the at least one processor further executes the color conversion module to determine one of a plurality of color gamuts according to a hue value of the each pixel, and perform the color conversion of the each pixel using a color conversion matrix corresponding to the one of the plurality of color gamuts.

3. The image processing device of claim 2, wherein the color conversion matrix is a 3×3 matrix, and a number of the plurality of color gamuts is 9.

4. The image processing device of claim 1, wherein the at least one processor further executes the color conversion module to change a color conversion matrix according to segmentation information indicating a pixel location within the input image.

5. The image processing device of claim 4, wherein the segmentation information is received from an external device.

6. The image processing device of claim 4, wherein the at least one processor further executes the color conversion module to apply the different color conversion matrices according to a shooting target.

7. The image processing device of claim 4, wherein the segmentation information includes an index value of a segmentation and a confidence value for the segmentation.

8. The image processing device of claim 7, wherein the at least one processor further executes the color conversion module to blend a base matrix and a segmentation matrix in a weighted average manner using the confidence value as a blending weight.

9. The image processing device of claim 1, wherein the at least one processor further executes the color conversion module to blend a low saturation matrix when a saturation value of an input pixel is lower than a threshold value.

10. The image processing device of claim 1, wherein the at least one processor further executes the color conversion module to, when an input pixel is located near a border of a plurality of color gamuts, interpolate color conversion matrices corresponding to the plurality of color gamuts to generate a final color conversion matrix, and perform the color conversion on the input image using the final color conversion matrix.

11. A method of operating an image processing device, the method comprising:

calculating a hue value of each pixel of an input image;

calculating a color gamut to which the hue value belongs;

calculating a color conversion matrix according to the color gamut; and performing color conversion of the each pixel using the color conversion matrix.

12. The method of claim 11, wherein according to the hue value, nine color gamuts are uniformly distinguished.

13. The method of claim 11, further comprising:

calculating a saturation value of the input image; and calculating a low saturation matrix when the saturation value is lower than a threshold value.

14. The method of claim 13, further comprising:

calculating a base matrix corresponding to the hue value;

calculating a segmentation matrix according to the color gamut and a segmentation index; and blending the base matrix and the segmentation matrix using segmentation information to generate a blended segmentation matrix.

15. The method of claim 14, further comprising:

blending the blended segmentation matrix and the low saturation matrix in a weighted average manner by using the saturation value as a blending weight to generate a blended low saturation matrix; and calculating the color conversion matrix using the blended low saturation matrix.

16. An electronic device comprising:

an image sensor configured to acquire an image of a target; and an application processor configured to perform conversion of a Hue, Saturation, Value (HSV) domain on the image, determine a color gamut to which each pixel belongs according to a value of a phase of the HSV domain, and perform different color conversion operations for the color gamut on each pixel of the image depending on the color to which the each pixel belongs.

17. The electronic device of claim 16, wherein the application processor distinguishes color gamuts according to hue values in the HSV domain, and performs color conversion on the image by applying a color conversion matrix corresponding to the distinguished color gamuts.

18. The electronic device of claim 16, wherein the application processor performs the color conversion on the image by applying different segmentation matrices according to segmentation information indicating a pixel location within the image.

19. The electronic device of claim 16, wherein the application processor calculates a saturation value of the image and performs the color conversion on the image by applying a low saturation matrix according to the saturation value.

20. The electronic device of claim 17, wherein color gamuts of phases of the HSV domain are settable by a user, and wherein the electronic device further comprises a display device that displays an output image on which the color conversion has been performed.

* * * * *